Patented May 28, 1940

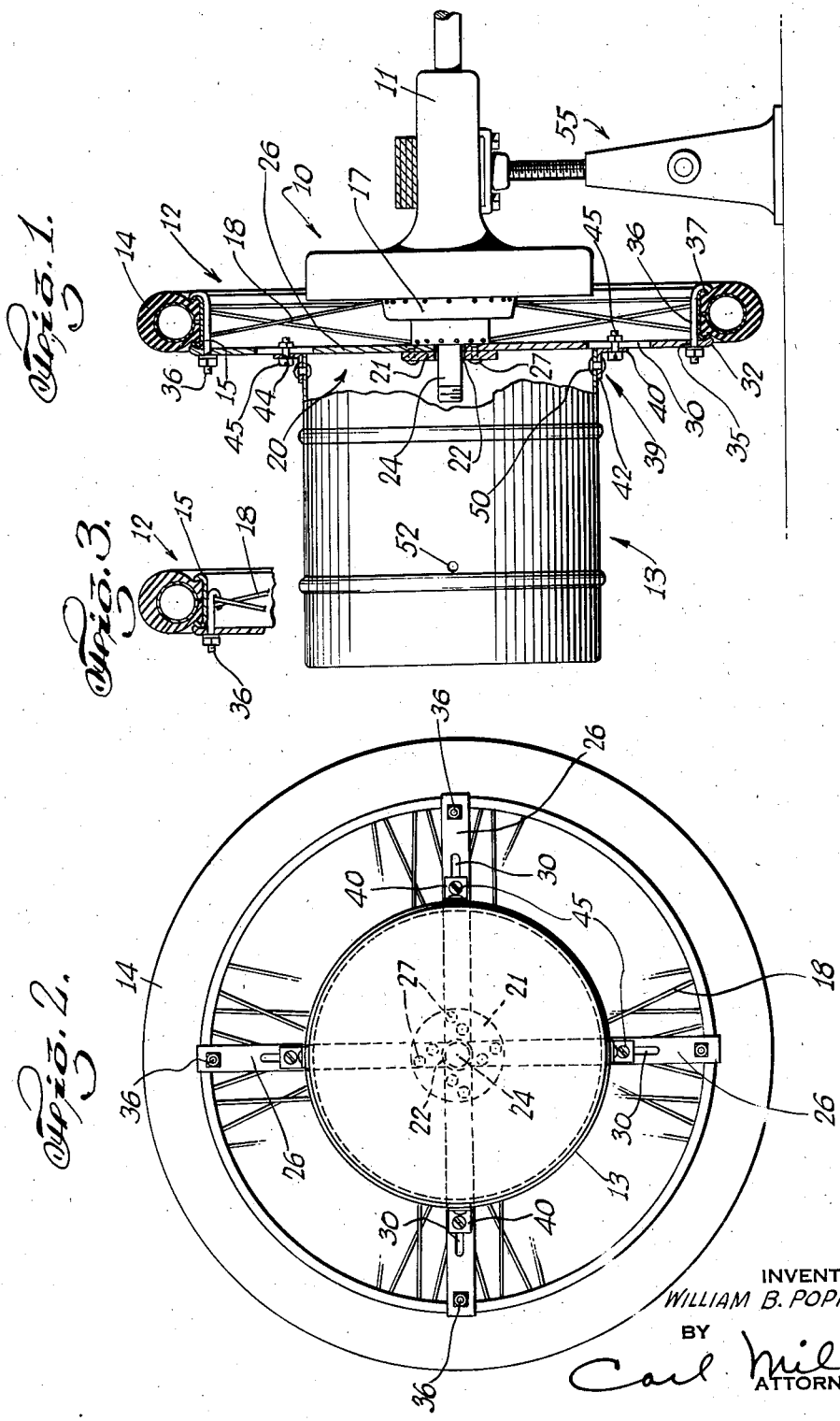

2,202,398

UNITED STATES PATENT OFFICE 2,202,398

WIRE REEL

William B. Poppenga, Lennox, S. Dak.

Application February 23, 1939, Serial No. 257,790

1 Claim. (Cl. 242—95)

This invention relates to wire reels. It is particularly directed to a wire reel affixed to a wheel of a vehicle, and so arranged that when the vehicle axis is jacked up and the wheel rotated, wire or rope may be wound on the reel.

An object of this invention is to provide a handy and cheap wire reel to be used for winding or unwinding, or reeling or unreeling all kinds of wire or rope on the farm or elsewhere.

A further object of this invention is to provide a simple and easily constructed reel of the character described, which shall be easy to operate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawing, in which is shown various possible illustrative embodiments of this invention, Fig. 1 is an elevational, cross-sectional view of a vehicle wheel and axle provided with a drum and forming a reel embodying the invention, the axle being shown in jacked up position;

Fig. 2 is a side elevational view of the wheel; and

Fig. 3 is a radial, cross-sectional view of the wheel and one of the drum supporting bars, illustrating a modified construction.

Referring now in detail to the drawing, 10 designates a winding reel embodying the invention, here shown in the form of a vehicle axle 11, supporting a wheel 12, to which is attached a winding drum 13.

The wheel and axle may be of usual construction, and may comprise a rear wheel and axle of an automobile, truck, tractor, or the like vehicle. As shown in the drawing, the wheel 12 comprises a tire 14 and a rim support 15, the latter being fixed to the hub 17 by spokes 18.

Means is provided to support the drum 13 axially of the wheel 12. To this end, there is provided a bracket 20 comprising a central circular plate 21, formed with a central opening 22 through which the stud 24 of the vehicle axle passes.

Fixed to the circular plate 21, are four radial bars 26, disposed at right angles to one another. The bars 26 may be attached to the plate 21 by rivets 27. Each bar 26 is formed with a longitudinal slot 30, for the purpose hereinafter appearing.

The outer end 32 of each bar 26 is curved inwardly to grip the outer edge of the vehicle rim 15. Each bar 26 is furthermore formed with an opening adjacent its outer end, and extending through each opening is a hook bolt 36, provided with a hook portion 37 to grip the inner edge of the vehicle rim 15.

Attached to each bar 26 is an angle bracket 39, having a wall 40 contacting the outer side of the bar, and a wall 42 extending at right angles to said bar. The wall 40 is formed with a through opening 44 to receive a bolt 45 passing through the slot 30, whereby to fix the angle shaped bracket to the bar.

The drum 13 may be an ordinary oil drum or of any suitable construction. The drum 13 is disposed axially with respect to the wheel 12, and the inner edge thereof contacts the inner surfaces of walls 42 of the angle shaped brackets 39. Said walls 42 are riveted, as at 50, to the oil drum. The oil drum may be removed from the wheel by withdrawing the bolts 45. The slots 30 permit the use of oil drums of various diameters. The oil drum 13 may be formed with a through opening 52 to receive one end of the wire to be wound on the drum.

It will now be understood that when the rear axle 11 is jacked by a jack 55, and the vehicle started, the wheel 12 will rotate to rotate the drum. In this manner, a wire may be either wound on the drum or unwound therefrom.

Thus, a farmer can use his own truck or tractor and an old discarded oil drum to cheaply and easily make a winding reel, which may be easily mounted on the vehicle wheel or demounted therefrom. The reel is light and easily applied, and will wind considerable length of fence wire or other wire at one winding.

In Fig. 3 there is shown a modified construction, in which the hook bolts 36 grip the wire spokes 18 of the vehicle wheel 12, instead of the rim 15 thereof.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

In combination with an axle and a wheel fixed thereto, said wheel comprising a vehicle tire, and an annular rim supporting said tire, and spokes interconnecting said rim with the hub of said wheel, a member comprising a plate having an opening receiving the stud of said axle, a plurality of radially extending bars fixed at their inner ends to said plate, the outer ends of said bars being curved and engaging an edge of the rim of said wheel, said bars being formed with openings adjacent their outer ends, bolts extending through said openings in said bars and having hook portions engaging the other edge of said rim, each of said bars being formed with a longitudinal slot, an angle shaped bracket for each bar, having a wall contacting said bar, and a wall extending longitudinally of the wheel axle, at right angles to said bar, a bolt extending through the first wall of each of said brackets and through the slot in the bar contacted by said wall, and fixing said bracket to said bar, and a drum disposed axially of said wheel, an edge of said drum being received between the longitudinally extending walls of said brackets and being riveted thereto.

WILLIAM B. POPPENGA.